Patented May 17, 1938

2,117,610

UNITED STATES PATENT OFFICE 2,117,610

MOTOR FUEL

James W. Jean, Altadena, Calif.

No Drawing. Application May 27, 1936,
Serial No. 82,047

1 Claim. (Cl. 44—9)

Motor fuels heretofore produced have been chiefly blends of petroleum solvents such as gasoline, and those of coal tar, such as benzol and with or without an agricultural product such as alcohol. It is well established that a motor fuel composed solely of alcohol cannot compete with gasoline for mileage or power, neither can acetone or any other single solvent made solely from agricultural products. I have found that a motor fuel composed solely of a combination of certain ingredients scientifically manufactured from agricultural products and blended, will produce a motor fuel equal or more effective than gasoline for mileage and power and with substantially no knocking properties.

In producing my improved motor fuel, I employ raw or low grade agricultural products, such as corn, corn cobs, corn stalks, table refuse, spoiled crops, wood saw dust, wood chips, wood shavings, cellulose, wheat, rye, oats, barley, rice, beet roots, potatoes, sweet potatoes, peanut hulls, horse chestnuts and other waste and fermented products, entirely free from coal tar or petroleum derivatives. These products are reduced by fermentation and distillation to butyl alcohol, acetone, ethyl ether, anhydrous ethyl alcohol and corn oil, or by chemical synthesis from chemicals and gases procured solely from said ingredients. These ingredients may be mixed in any suitable proportions and the resulting liquid is a motor fuel which will readily vaporize and when compressed in an internal combustion engine, will readily ignite and explode. Experiment has proven that the following proportions are approximately correct to produce a highly efficient motor fuel.

|  | Percent |
|---|---|
| Butyl alcohol | 35 |
| Acetone | 30 |
| Ethyl ether | 10 |
| Ethyl alcohol | 20 |
| Corn oil | 5 |

Each of the above ingredients as stated is made by fermenting an agricultural product or combination of products or by chemical synthesis from chemicals and gases procured solely from said products. These ingredients also may be varied somewhat in larger or smaller percentages or other solvents made solely from agricultural products may be substituted to obtain substantially the same effect as a highly efficient motor fuel, hence, I claim to have produced a motor fuel blended together from solvents made solely from agricultural products and waste such as mentioned and entirely free from coal tar or petroleum derivatives.

The acetone and butyl alcohol provide power and high volatility to the product. The ethyl ether and ethyl alcohol increase the vapor pressure and render the composition more volatile. The corn oil renders better distribution of the fuel throughout the manifold of the engine, acts as a lubricant and assists in preventing solvent action by the composition of enamel, paint and varnish.

I have found that my improved combination of ingredients has marked advantages over combinations of ingredients heretofore employed, among which are the following:

An internal combustion engine operated by the use of my improved motor fuel is smooth, while power out-put is good and fuel consumption low: substantially no carbureter adjustment is required beyond that used for carbureting gasoline: practically no carbon deposit upon the inner surfaces of the cylinder, piston head and valves or carbon knock occur, and the engine produces good heavy pulling characteristics with substantially no over heating effect. The fuel compound can readily be compressed to a highly efficient extent, has a high flash test, is permanent and will not separate into its constituent parts after long standing or being subjected to ordinary changes of temperature, is substantially completely consumed by combustion when used, is more economical than other fuels when used to operate internal combustion engines, and may be used in place of gasoline and other fuel oil most effectively.

I have stated generally the ingredients and proportions thereof of which my improved fuel is composed, but I wish to have it understood that these ingredients may, within the doctrine of equivalents be varied in proportion and otherwise, within the scope of the following claim.

Having described my invention, what I claim as new and desire to secure by Letters Patent is:

A motor fuel devoid of coal tar and petroleum products, comprising the following constituents in substantially the following proportions, butyl alcohol 35 parts, acetone 30 parts, ethyl ether 10 parts, ethyl alcohol 20 parts and corn oil 5 parts.

JAMES W. JEAN.